United States Patent [19]

Steinkamp et al.

[11] Patent Number: 5,511,827
[45] Date of Patent: Apr. 30, 1996

[54] PUSH-FIT CONNECTOR FOR JOINING TWO FLUID LINES

[75] Inventors: Christoph Steinkamp, Biebergemünd; Bernd Kleinhens, Hasselroth, both of Germany

[73] Assignee: Rasmussen GmbH, Maintal, Germany

[21] Appl. No.: 422,302

[22] Filed: Apr. 13, 1995

[30] Foreign Application Priority Data

Apr. 18, 1994 [DE] Germany ............... 44 13 346.4

[51] Int. Cl.⁶ ..................................... F16L 35/00
[52] U.S. Cl. ............... 285/39; 285/308; 285/319; 285/921
[58] Field of Search .................. 285/319, 921, 285/38, 39, 308

[56] References Cited

U.S. PATENT DOCUMENTS

| | | | |
|---|---|---|---|
| 4,836,580 | 6/1989 | Farrell | 285/319 X |
| 5,112,086 | 5/1992 | Gruber et al. | 285/319 X |
| 5,284,369 | 2/1994 | Kitamura | 285/319 X |
| 5,320,390 | 6/1994 | Kodama | 285/319 X |

FOREIGN PATENT DOCUMENTS 0459016  12/1991  European Pat. Off. .
0465896  1/1992  European Pat. Off. .
4334529  4/1994  Germany .

Primary Examiner—Dave W. Arola
Attorney, Agent, or Firm—Darby & Darby

[57] ABSTRACT

A push-fit connector for joining two fluid lines (1, 4), one of which is provided with a retaining rib (2), has a sleeve (5) with radial apertures (12, 13). A latching device (6) which can be inserted into the sleeve (5) has retaining arms each provided with a hook (20) for gripping behind the retaining rib (2) and a radially external inclined surface (21). When the sleeve (5) and latching device (6) move apart, the inclined surfaces (21) are compressed against a front edge of an aperture (12) receiving the hook (20) in an axially displaceable manner, so that the hook (20) stays correspondingly more tightly engaged with the retaining rib (2). When the latching device (6) and the inserted fluid line (1) are pulled apart, a radially internal inclined surface (23) of the hook comes into contact with the retaining rib (2) so that the retaining arms (18) are spread apart and make uncoupling possible. To facilitate uncoupling, the latching device (6) has at least one unlatching arm (19) between at least one pair of adjacent retaining arms (18), which unlatching arm projects outwards through an aperture (13) in the sleeve (5) in an axially displaceable manner.

11 Claims, 5 Drawing Sheets

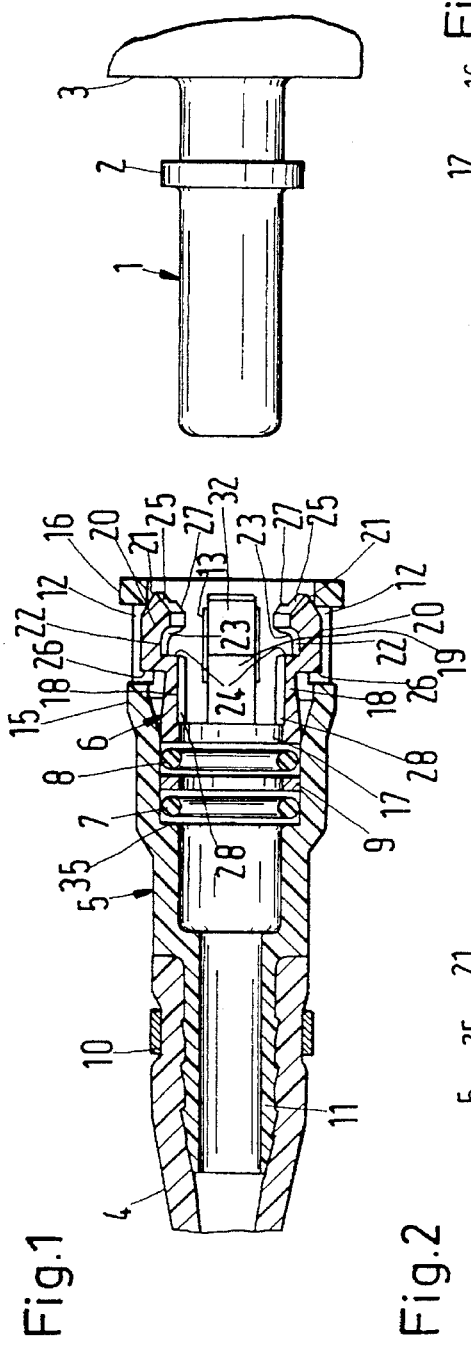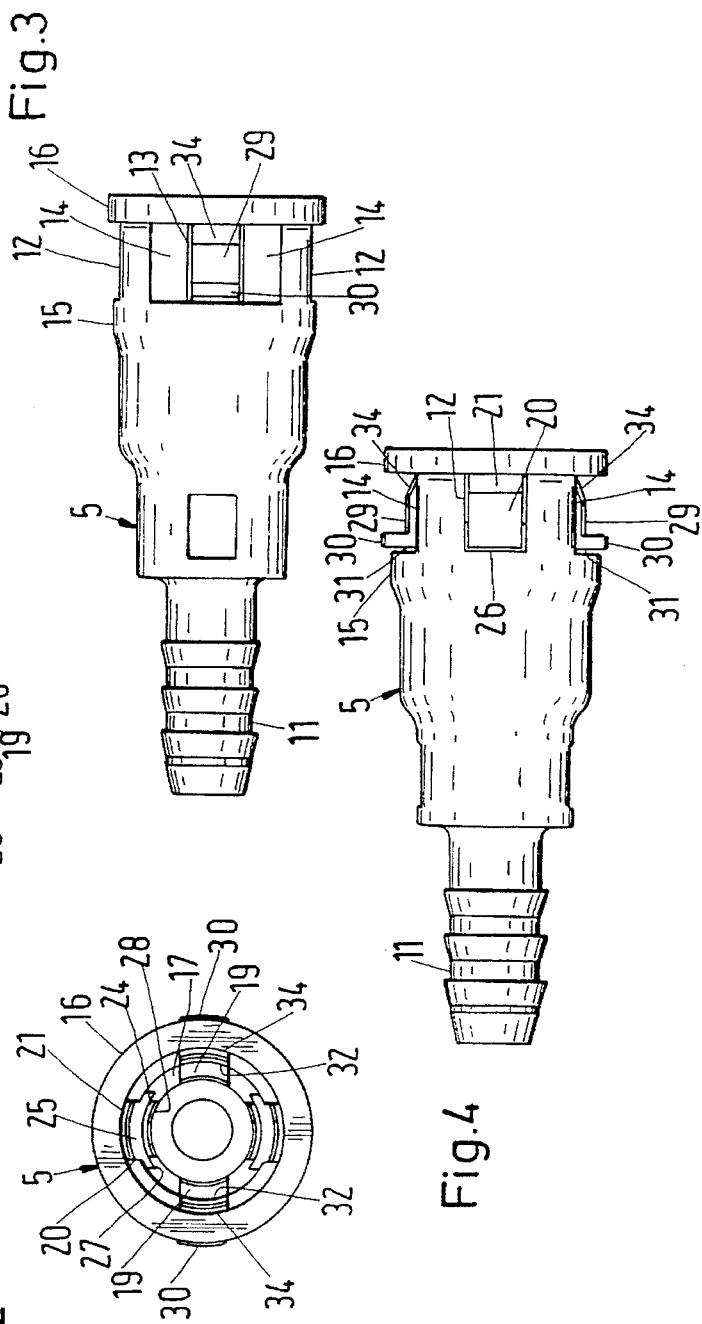
Fig.1
Fig.2
Fig.3
Fig.4

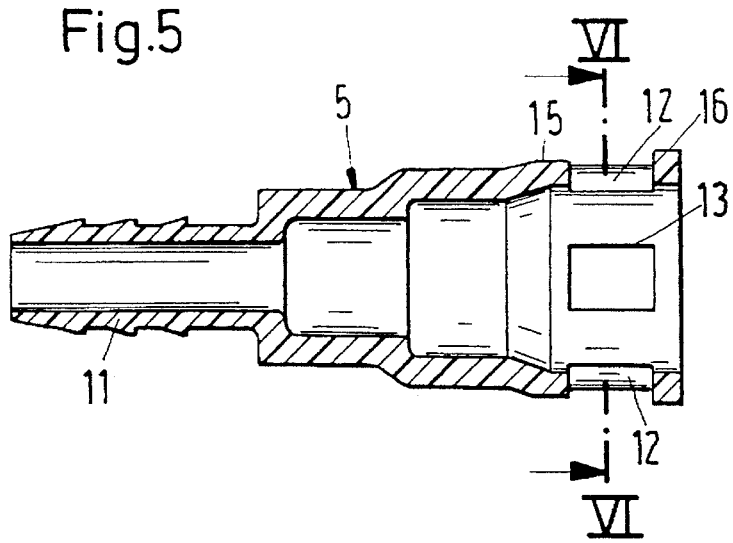
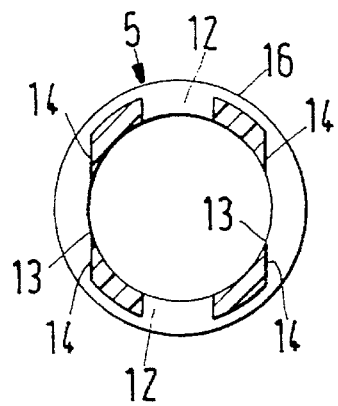
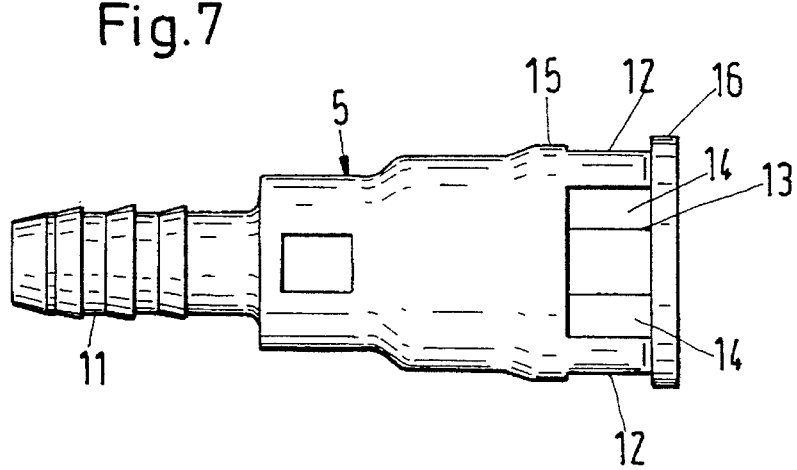
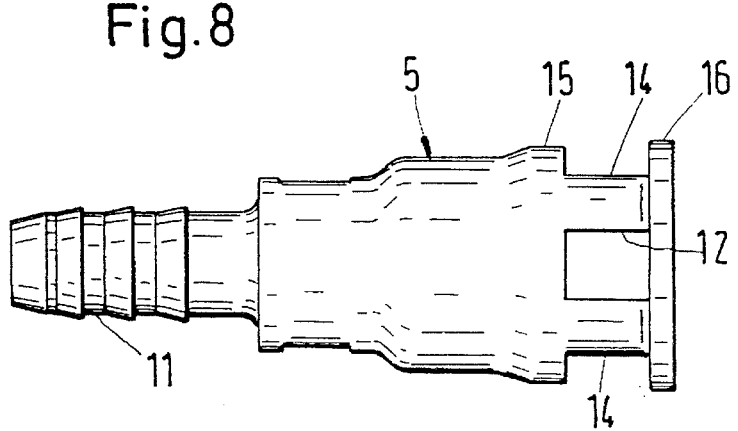

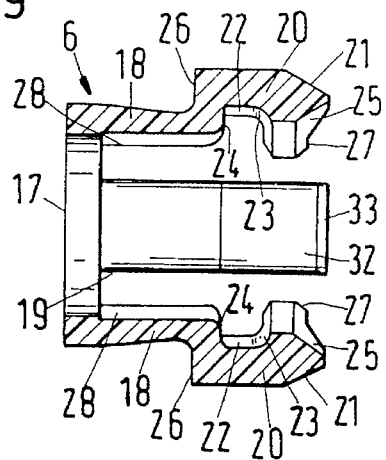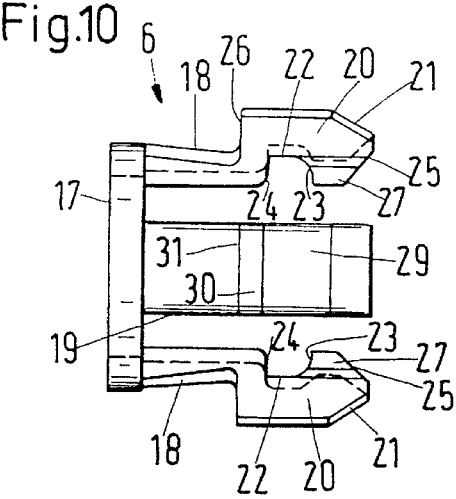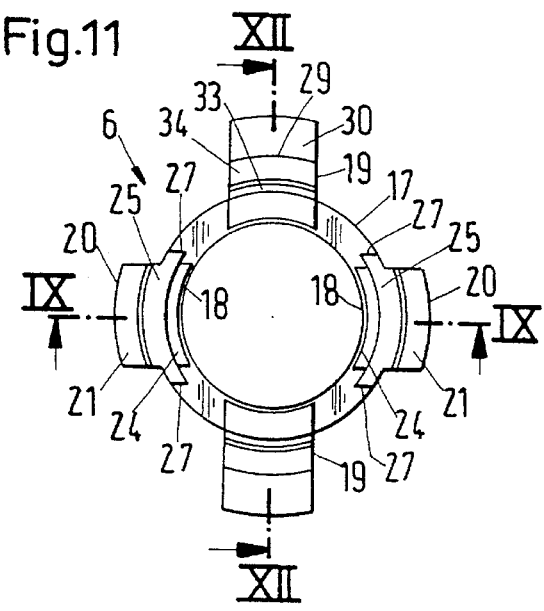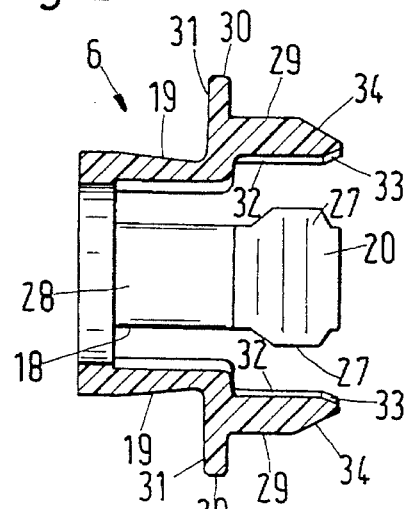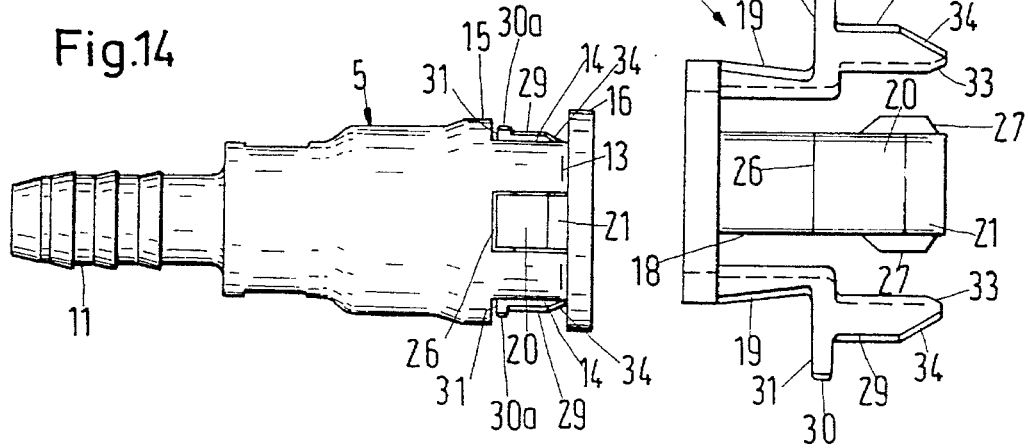

PUSH-FIT CONNECTOR FOR JOINING TWO FLUID LINES

BACKGROUND OF THE INVENTION

The invention relates to a push-fit connector of a type for joining two fluid lines, one of which is provided with at least one retaining rib. Such a connector usually includes a sleeve provided with radial apertures. A cylindrical latching device is axially moveable in the sleeve and provided with axially extending and elastically flexible retaining arms each having a hook configured on its free end for grasping behind the retaining rib of said one fluid line inserted axially into the latching device. The hooks are provided on their free ends with a radially external inclined surface which, when the sleeve and latching device are moved in a direction apart from one another, is pressed against a front edge of an aperture in the sleeve, which aperture receives the radially external part of the hook in an axially displaceable manner, so that the hook concerned stays correspondingly more tightly engaged with the retaining rib. The hooks are provided with a radially internal inclined surface which comes into contact with the retaining rib when the latching device and inserted fluid line are pulled in a direction apart from one another, so that the retaining arms are spread apart and allow uncoupling. There also is at least one sealing ring between an inner shoulder of the sleeve and the latching device.

In a known push-fit connector of this type (EP 465 896 B1), the latching device has, on its axially external end, a flange projecting radially outward and onto which the latching device must take hold of manually when it is pushed axially inwards into the sleeve; this is in order to be able to pull out and uncouple one fluid line from the latching device while there is radial spreading of the retaining arms. This means that the push-fit connector must be accessible axially from the front. In many cases this is not possible, for example, in the case where the fluid line inserted in the latching device is a pipe socket which is molded onto a housing, for example, the housing of a motor vehicle radiator. In this case, the distance between the push-fit connector and the housing is often too small for the flange of the latching device to be comfortably taken hold of manually. It also would be too expensive in terms of materials to make the pipe sockets longer and locate the retaining ribs at a greater distance from the radiator housing.

Thus, it is an object of the invention to provide a push-fit connector of the type described which allows easier uncoupling of the fluid line inserted in the push-fit connector even in cases where the push-fit connector is not accessible from the insertion side.

BRIEF DESCRIPTION OF THE INVENTION

This object is accomplished according to the invention in that the latching device is provided with an unlatching arm between at least one pair of adjacent retaining arms, which unlatching arm projects outward through one of the latching device apertures in an axially displaceable manner.

It is possible by means of this unlatching arm to press the latching device axially further inside the sleeve for the purpose of uncoupling the inserted fluid line, even when the sleeve is at only a small distance or even no distance at all from another object.

The latching device can also be provided with a ring on which the retaining and unlatching arms are axially molded. This configuration saves material and makes possible complete insertion of the latching device in the sleeve without the latching device projecting axially out of the sleeve. A pipe socket forming the fluid line can therefore be made shorter, as the sleeve and the latching device can be pushed onto the pipe socket as far as the end opposite the insertion end.

It is also advantageous to provide at least one of the retaining and unlatching arms with a radial contact surface for contacting a lead edge of the aperture in order to limit the insertion of the latching device. This insertion limit not only ensures that during assembly the latching device is brought into the correct position, but also that during insertion of one of the fluid lines into the latching device, the sealing ring is not compressed by the displacement of the latching device in the sleeve thereby affected. Moreover, there is no need for an axial retaining ring for the sealing ring between the sealing ring and the latching device.

It is further preferably ensured that the hooks for receiving the retaining rib are provided on their radially internal sides with a recess, which is delimited on its axially external inner side by a radially internal inclined surface of curved shape and on its axially internal inner side by a radial surface and dimensioned so that the recess receives the retaining rib, regardless of the tolerances of the rib axial width, without any clearance.

In the area of the aperture receiving it, each unlatching arm can project beyond the circularly cylindrical periphery of the sleeve. It is therefore easy to manually take hold of and displace the unlatching arms, together with the latching device, for the purpose of uncoupling the inserted fluid line.

It is also possible to provide the sleeve with a flattened area extending transversely with respect to the longitudinal axis of the sleeve on both sides of each aperture receiving an unlatching arm. The unlatching arm extending through this aperture extends beyond this flattened area at the most up to the smaller one of two different cylindrical sleeve surface diameters on axially adjacent sides of the aperture. An axial intermediate space exists between the part of the unlatching arm projecting out of the aperture and the larger diameter surface part of the sleeve for inserting an unlatching tool. In this configuration, the displacement of the latching device can also be effected by means of a tool, for example, a fork wrench.

When two unlatching arms diametrically opposite one another with respect to the longitudinal axis of the sleeve are provided, they can be simultaneously displaced with one hand or, for example, with a fork wrench, for uncoupling. In addition, two retaining arms to a large extent counteract radial displacement of the push-fit connector when a radial force is exerted on the push-fit connector.

The unlatching arms can be elastically flexible and provided with a partly cylindrical internal surface for fixing onto the radial external edge of the retaining rib, which merges towards the free end of the unlatching arm into an inclined surface. This configuration of the unlatching arms also contributes to the prevention of radial displacement of the push-fit connector and thereby effects guidance of the fluid line inserted in the latching device. The inclined surface on the free end of the unlatching arms thereby facilitates the insertion of the fluid line into the latching device.

The hooks can be provided with lateral projections for fitting into the interior of the sleeve. This configuration increases the resistance of the retaining arms to a lateral displacement of the push-fit connector.

Each unlatching arm can also be provided with a radially external inclined surface on the free end. It is then also pressed radially inward against the retaining rib, when the fluid line inserted in the latching device is pressed axially outward, because of the internal pressure of the pipeline. The retaining arms then also contribute to the axial retention of the inserted fluid line.

BRIEF DESCRIPTION OF THE DRAWINGS

The invention and its further developments will now be described in more detail with the aid of the drawings of preferred embodiments in which:

FIG. 1 is an axial section of a push-fit connector according to the invention with a fluid line to be inserted into the push-fit connector in the form of a pipe socket with a retaining rib;

FIG. 2 is a front view of the push-fit connector according to FIG. 1;

FIG. 3 is a side view of the push-fit connector according to FIG. 1;

FIG. 4 is a side view of the push-fit connector according to FIG. 1 in a position rotated by 90° about its longitudinal axis with respect to the push-fit connector according to FIG. 3;

FIG. 5 is an axial section through a sleeve of the push-fit connector;

FIG. 6 is a section along lines VI—VI of FIG. 5;

FIG. 7 is a side view of the sleeve according to FIG. 5;

FIG. 8 is a side view of the sleeve in a position rotated by 90° about its longitudinal axis with respect to the position according to FIG. 7;

FIG. 9 is the section through lines IX—IX of FIG. 11 of the latching device of the push-fit connector according to the invention;

FIG. 10 is a side view of the latching device;

FIG. 11 is a front view of the latching device;

FIG. 12 is a section along lines XII—XII of FIG. 11;

FIG. 13 is a side view of the latching device in the position of the angle of rotation according to FIG. 12;

FIG. 14 is a longitudinal view of a modification of the push-fit connector according to the invention;

DETAILED DESCRIPTION OF THE INVENTION

Figure 15:
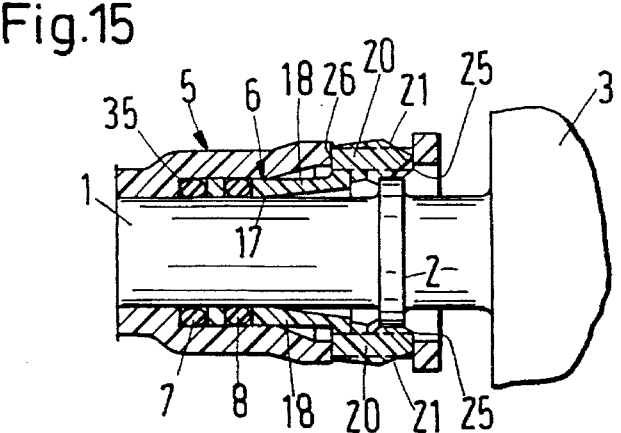
FIGS. 15 to 18 are views of different phases in the use of the push-fit connector according to the invention for explaining its method of operation.

The push-fit connector according to FIGS. 1 to 4 serves to join a fluid line 1, in the form of a pipe socket which is provided with a continuous external retaining rib 2, with a fluid line 4. Fluid line 1 is a part of the housing 3 of a motor vehicle radiator and is to be joined to a fluid line 4 in the form of a hose made of plastic. The push-fit connector has a cylindrical sleeve 5, a latching device 6 and two sealing rings 7 and 8 in the form of O-rings with a retaining ring 9 arranged between them. There is also a tensionable hose band clip 10, clamping sleeve or similar clamp, which is fixed around the hose 4 and clamps it firmly to a ribbed end section 11 of the sleeve 5.

The other end section of the sleeve 5 has four radial apertures 12 and 13 of generally rectangular shape, regularly distributed about its periphery, which extend in the longitudinal direction of the sleeve 5. The end section of the sleeve 5 provided with the apertures 12, 13 has a larger diameter than the adjacent section of the sleeve 5 which receives the rings 7, 8 and 9. The section of the sleeve 5 adjacent to the end section 11 is provided with an internal diameter which is approximately the same as the external diameter of the fluid line 1, and the internal diameter of the end section 11 is equal to the internal diameter of the fluid line 1. As shown more clearly in FIGS. 3, 4 and 6 to 8, the sleeve 5 has externally on both sides of each aperture 13 a flattened area 14 extending transversely with respect to the sleeve longitudinal axis. On both sides of the apertures 12, 13 the sleeve 5 has cylindrical surfaces 15 and 16 with different diameters, wherein the surface 16 adjacent to the end of the sleeve 5 has a larger diameter than the surface 15.

As shown, in particular in FIGS. 9 to 13, the latching device 6 comprises a closed ring 17 having two elastically flexible retaining arms 18 and two elastically flexible unlatching arms 19 molded onto it. Each retaining arm 18 has on its free end a hook 20 for grasping behind the retaining rib 2 when the fluid line 1 is inserted axially into the latching device 6. The hooks 20 have on their free ends a radially outer inclined surface 21 and on their radially inner side a recess 22. The recess 22 is delimited on its axially external inner side by a radially inner inclined surface 23 of curved shape and on its axially internal inner side by a radial surface 24, dimensioned such that it can receive without any clearance the retaining rib 2, regardless of the tolerances in the axial width of the retaining rib. Furthermore, each hook 20 has a radially inner inclined surface 25 adjacent to its free end and a radial contact surface 26 opposite to the axial front end for contacting a rear edge of the respective aperture 12 for limiting the insertion of the latching device 6. Lastly, each retaining arm at the front end of the hook 20 is provided with a lateral projection 27 for contacting the inside of the sleeve 5. The radially internal surface 28 of each retaining arm 18 is partly cylindrical and has a diameter corresponding to the diameter of the fluid line 1.

The unlatching arms 19 lie between the retaining arms 18. That is, the retaining arms 18 and the unlatching arms 19 are spaced about the periphery of the substantially cylindrical latching device 6 at the same angular spacing so that the two retaining arms 18 and its hooks 20 are diametrically opposite with respect to the longitudinal axis of the sleeve 5 or of the latching device 6 in the same way as the unlatching arms 19. Radially external parts of the hooks 20 project into the apertures 12 of the sleeve 5 and are axially displaceable in the apertures. Axial external parts 29 of the unlatching arms 19 project into and outwardly through the apertures 13 (see in particular FIG. 4).

The radial external parts 29 of the unlatching arms 19 are additionally each provided with a projection 30 projecting radially outward beyond the cylindrical surface 15. The exterior of the radial external part 29 lies on the circumference of a circle, the diameter of which is smaller than that of the surface 15. The radially external parts 29 and the projections 30 are also axially displaceable within the apertures 13 which receive them. As with the hooks 20, the radially external parts 29 and the projections 30 have a radial contact surface 31 for contacting a rear edge of the aperture 13 for limiting the insertion of the latching device 6. The unlatching arms 19 are also elastically flexible and have a partly cylindrical internal surface 32 for contacting the radially external edge of the retaining rib 2, which merges towards the free end of the unlatching arm 19 into an inclined surface 33. In the same way, each unlatching arm 19 has on its free end a radially external inclined surface 34.

The push-fit connector according to FIG. 14 differs from that according to FIGS. 1 to 13 only in that the projection 30a is shorter than the projection 30, so that it does not project beyond the surface 15.

Hereinafter, the method of operation of the push-fit connector according to FIGS. 1 to 13 will be described in more detail with the aid of FIGS. 15 to 18.

In order to join the fluid lines 1 and 4, the push-fit connector, with the fluid line 4 connected thereto according to FIG. 1, is pushed onto the fluid line 1. When this is done, the retaining rib 2 presses against the inclined surfaces 25 of the hooks 20. On the one hand, this spreads the retaining arms 18 radially outwards and, on the other hand, the entire latching device 6 is pushed out of the position according to FIG. 1 further into the sleeve 5, until the contact surfaces 26 and 31 of the retaining arms 18 or unlatching arms 19 lie on the rear edge of the apertures 12 or 13, as shown in FIG. 15. In this position, the sealing rings 7, 8 are enclosed between an internal shoulder 35 of the sleeve 5 and the latching device 6, without compressing the sealing rings 7, 8.

Upon further pressing together of the push-fit connector and the fluid line 1, the retaining arms 18 grip beyond the retaining rib 2 by means of the hooks 20. Because of the tension obtained by the spreading in the position according to FIG. 15, the hooks 20 spring back into the position according to FIG. 16. In the position according to FIG. 16, the fluid line 1 and the hose 4 are joined tightly to one another, wherein the fluid line 1 is guided on its sides at several points. The fluid line 1 is radially supported on the one hand in the sleeve 5 and, on the other hand, by means of the ring 17 of the latching device 6 as well as by means of the retaining arms 20 and the unlatching arms 19. The unlatching arms 19 effect the supporting in that their partly cylindrical internal surfaces 32 also fit onto the external periphery of the retaining rib 2. The connection therefore also withstands high degrees of radial forces without radial deflection of the push-fit connector relative to the fluid line 1.

Figure 16:
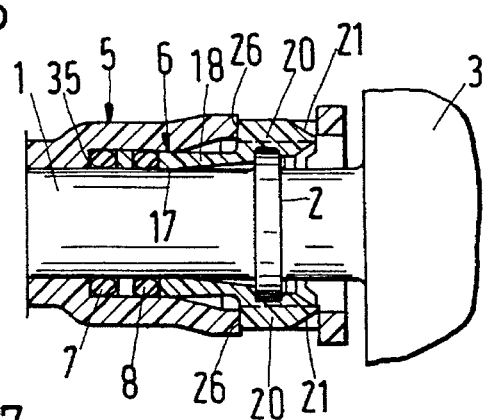
Figure 17:
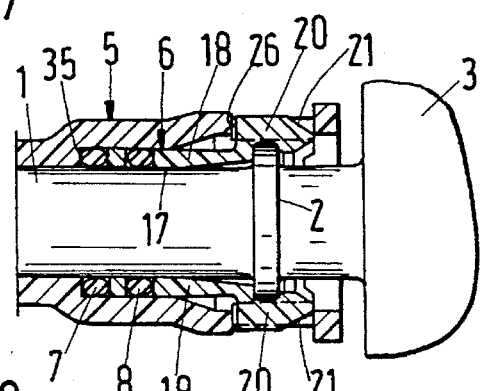
Figure 18:
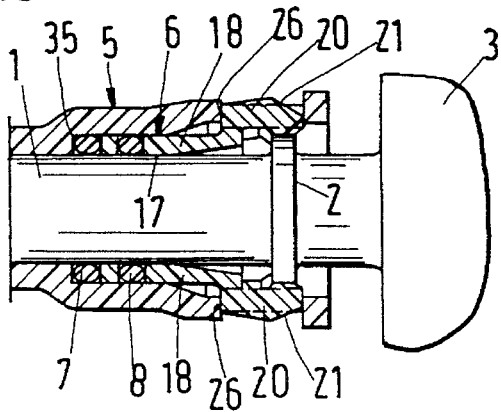

When a high pressure builds up in the fluid lines 1 and 4 in the position according to FIG. 16, its axial components affect the sleeve 5 and the fluid line 1 so that they are pulled apart axially. However, the inclined surfaces 21 of the retaining arms 18 and the inclined surfaces 34 of the unlatching arms 19 then come into contact with the front internal edge of the apertures 12 and 13, respectively, so that the hooks 20 and the front end section of the unlatching arms 19 are pressed even more tightly against the retaining rib 2, as is shown in FIG. 17.

In order to separate the connection between the fluid lines 1 and 4, the projections 30 of the unlatching arms 19, projecting beyond the periphery of the surface 15 according to FIG. 4, can be taken hold of manually and then the latching device 6 can be pushed back again into the position according to FIG. 16. While the projections 30 remain tightly held, the entire push-fit connector can then be pulled off of the fluid line 1 and the retaining arms 18 spread out according to FIG. 18.

The uncoupling can also be effected using a common tool, for example, a fork wrench, which is inserted between the projections 30 (FIG. 4) and the front flange of the sleeve 5 transversely to the longitudinal direction of the sleeve 5, and pressed rearwardly against the retaining arms 30.

In order to make manual uncoupling more difficult, which is desired in many cases for safety reasons, the embodiment according to FIG. 14 can be used, in which the projections 30a are shorter so that they do not project beyond the surface 15. Despite this, uncoupling by means of a tool such as a fork wrench is easily possible.

As shown, in particular in FIGS. 16 and 17, in the coupled state the push-fit connector can be at a very small distance from the housing 3. Despite this, uncoupling is easily possible—contrary to a conventional push-fit connector in which the latching device is only accessible from the front of the push-fit connector. The pipe socket forming the fluid line 1 can therefore be made correspondingly shorter.

Figure 19:
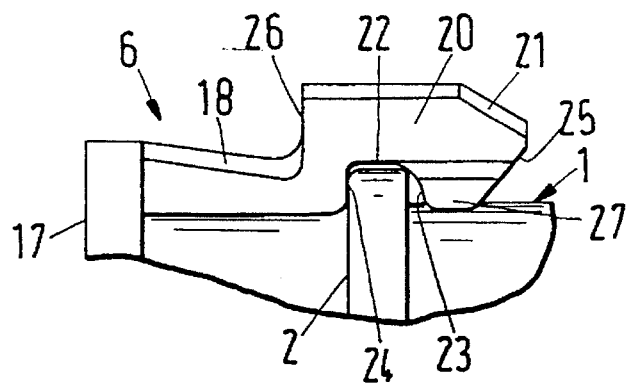
FIGS. 19 to 21 are different individual representations of a retaining arm of the push-fit coupling according to the invention in cooperation with a retaining rib of a fluid line to be coupled, the rib having different widths or dimensional tolerances.
Figure 20:
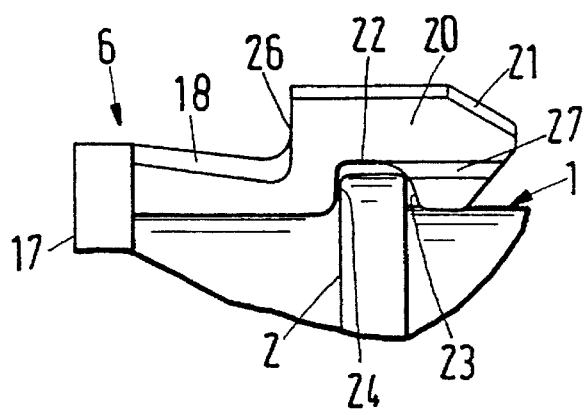
Figure 21:
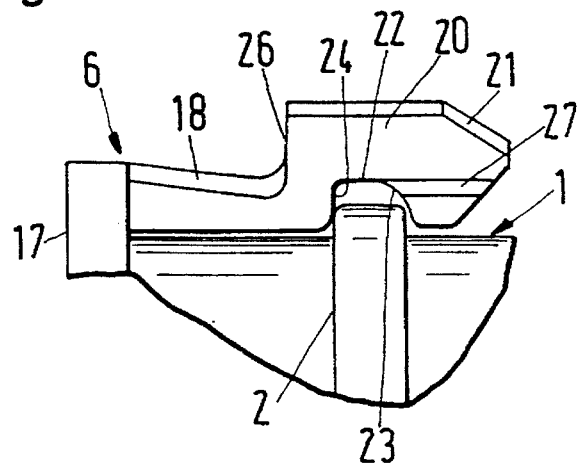

FIGS. 19 to 21 show the cooperation of the retaining arms 18 with a fluid line 1, the retaining rib 2 of which has a different axial width because of different tolerances. The retaining rib 2 according to FIG. 19 is slightly narrower than that according to FIG. 20, while the retaining rib according to FIG. 20 is again somewhat narrower than that according to FIG. 21. In all cases, the retaining rib 2 is, however, received securely in the recesses 22 of the hooks 20 without axial clearance because of the inclination or curvature, respectively, of the inclined surfaces 23.

We claim:

1. Push-fit connector for joining two fluid lines, one of which is provided with a retaining rib, comprising:

a sleeve having a central opening to receive the one fluid line with retaining rib, said sleeve having a plurality of apertures spaced around its circumference;

a latching device within said sleeve having a main body with at least one abutting surface cooperating with a surface within said sleeve to permit limited movement of said latching device within said sleeve along the sleeve longitudinal axis, said latching device having a pair of elastically flexible retaining arms spaced apart on and extending from said main body generally axially of the sleeve, each said retaining arm having a hook on its free end projecting toward said sleeve longitudinal axis for grasping behind the retaining rib of the one fluid line inserted axially into the latching device between said retaining arms to couple said latching device to the one fluid line, the inner surface of the free end of a hook having an inclined surface which, when said sleeve and said latching device and the one fluid line are moved toward each other, moves over the retaining rib of the one fluid line to spread the retaining arms apart to permit the hook to latch over the retaining rib, each hook also having an external part disposed in a respective aperture that is axially movable of the sleeve within the respective aperture, the front edge of the free end of a said hook having an outer surface inclined toward the sleeve axis which, when the one fluid line moves apart from the sleeve and retaining device, said hook becomes correspondingly more tightly engaged with the retaining rib by said hook front edge inclined outer surface within its respective aperture engaging the sleeve at a first edge of the respective aperture closest to said central opening, each hook also having an internal inclined surface which contacts the retaining rib when the latching device and inserted one fluid line are moved apart from one another to move the retaining arms radially outward of the one fluid line retaining rib and spread the retaining arms apart to allow uncoupling of the one fluid line from said latching device; and at least one unlatching arm extending generally axially of said sleeve from said latching device body between at least one pair of adjacent retaining arms and having an actuating part projecting outward through a respective one of said apertures to be engaged to move said locking device axially away from said sleeve central opening to uncouple the hooks of the retaining arms from the retaining rib of the one fluid line as the one fluid line is moved away from said locking device.

2. Push-fit connector according to claim 1, wherein the latching device main body comprises a ring on which said retaining and unlatching arms are formed for extending axially of said sleeve toward said sleeve central opening.

3. Push-fit connector according to claim 1, wherein at least one of said retaining and unlatching arms is provided with a surface part for contacting the edge of the aperture most remote from said sleeve central opening within which a respective arm is received for limiting axial movement of the latching device within the sleeve.

4. Push-fit connector according to claim 1 wherein said hook of a retaining arm has a recess on its internal side for receiving the retaining rib of the one fluid line, the recess having on its side closest to said sleeve central opening an internal inclined surface of curved shape and on its side most remote from said sleeve central opening a curved surface, said recess dimensioned to receive a retaining rib of the one fluid line without any substantial clearance.

5. Push-fit connector according to claim 1 wherein an unlatching arm actuating part projects through its respective aperture beyond the outer surface of said sleeve in the area of the respective aperture.

6. Push-fit connector according to claim 1 wherein the sleeve external surface includes a flattened area extending transversely of the sleeve longitudinal axis on each side of each said aperture receiving an unlatching arm, an unlatching arm actuating part extending through its respective aperture beyond the flattened area for a distance no greater than one of two different cylindrical sleeve external surface diameters on both axially adjacent sides of the aperture through which the unlatching arm actuating part extends, and an axial intermediate space provided between the part of the unlatching arm actuating part projecting out of its respective aperture and the surface of the sleeve with the larger of the two external surface diameters to leave a space for insertion of an unlatching tool.

7. Push-fit connector according to claim 1 wherein there are two unlatching arms located diametrically opposite each other with respect to the sleeve longitudinal axis.

8. Push-fit connector according to claim 7, wherein each of said unlatching arms is flexible and has a partly cylindrical internal surface for engaging the radially external edge of the retaining rib at the one fluid line, said unlatching arm internal surface towards the free end of the respective unlatching arm being inclined.

9. Push-fit connector according to claim 1 wherein each of said hooks includes a lateral projection for engaging the interior of the sleeve.

10. Push-fit connector according to claim 1 wherein the free end of a said unlatching arm includes an external surface inclined toward said sleeve axis.

11. Push-fit connector as in claim 1 further comprising at least one sealing ring between an inner shoulder of the sleeve and the latching device to seal the internal part of the sleeve.

* * * * *